Oct. 6, 1953     I. J. SNADER     2,654,291
HYDRAULIC TRANSMISSION FOR MACHINE TOOLS
Original Filed Dec. 2, 1937     6 Sheets-Sheet 1

Fig.1

INVENTOR
Ira J. Snader
By Parker, Carlson, Pitzner & Hubbard
ATTORNEYS

Patented Oct. 6, 1953

2,654,291

UNITED STATES PATENT OFFICE 2,654,291

HYDRAULIC TRANSMISSION FOR MACHINE TOOLS

Ira J. Snader, Detroit, Mich., assignor to Ex-Cell-O Corporation, Detroit, Mich., a corporation of Michigan Application August 3, 1940, Serial No. 351,040, now Patent No. 2,436,406, dated February 24, 1948, which is a division of application Serial No. 177,693, December 2, 1937, now Patent No. 2,251,961, dated August 12, 1941. Divided and this application November 25, 1947, Serial No. 787,869

1 Claim. (Cl. 90—22)

The present invention relates to improvements in hydraulic transmissions for machine tools for performing material cutting operations, particularly machine tools for grinding screw threads.

One of the objects of the invention is to provide a hydraulic transmission having a plurality of reversible motors for operating a plurality of machine elements, and control means for simultaneously supplying fluid under pressure reversibly thereto.

Another object is to provide an operating mechanism for at least three movable elements of a machine, including independent hydraulic motors for actuating said elements, and control means for supplying motivating fluid from a common source at different pressures to said motors.

Further objects and advantages will become apparent as the description proceeds.

The present application is a division of my copending application Serial No. 351,040, filed August 3, 1940, now Patent No. 2,436,406, dated February 24, 1948, which copending application is in turn a division of original application Serial No. 177,693, filed December 2, 1937, and now Patent No. 2,251,961, dated August 12, 1941.

Figure 1:
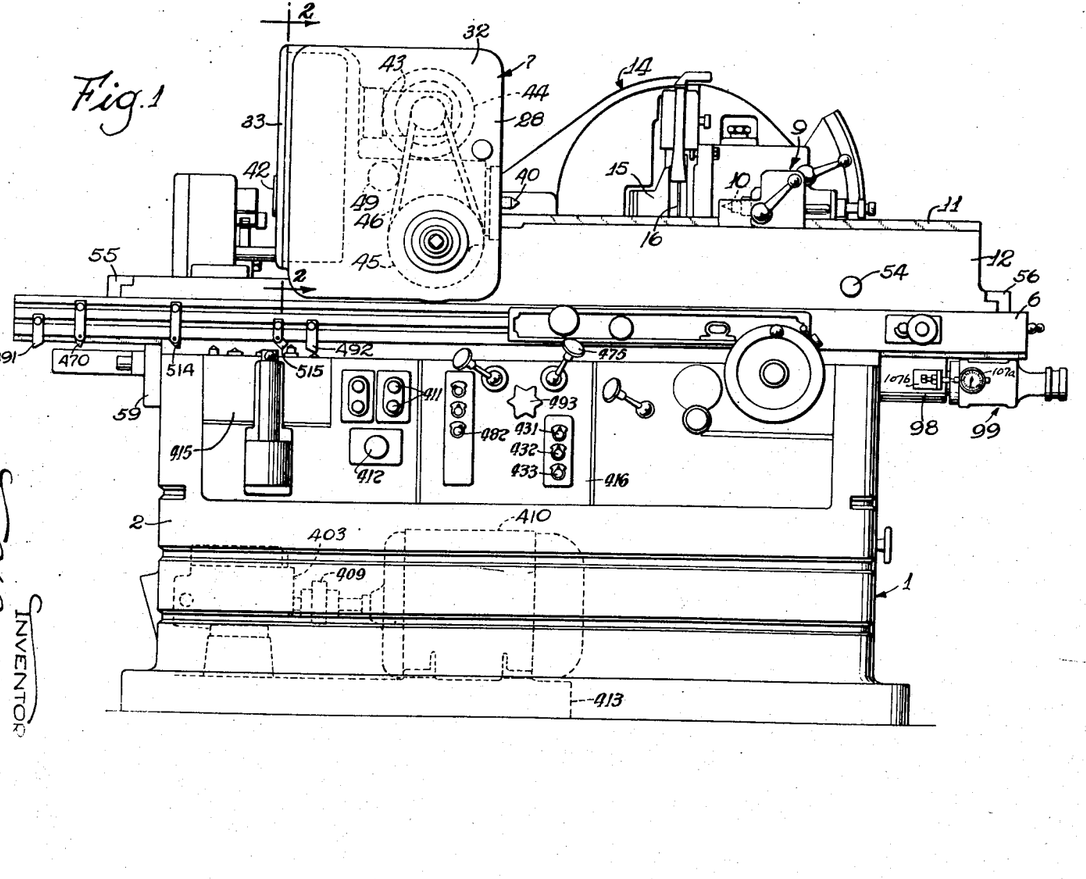
Figure 1 is a front elevational view of the machine having a hydraulic transmission embodying the features of my invention.

Referring more particularly to the drawings, the hydraulic transmission, constituting the exemplary embodiment of the invention, is incorporated in a machine comprising a base 1 which may be of any suitable form, and which preferably is horizontal, with an elongated front section 2. The top of the base section 2 is formed with longitudinal ways on which a work carriage or table 6 is suitably mounted for reciprocation. A headstock 7, having a power driven work spindle 8, is mounted on the carriage 6 for movement therewith, and is pivotally adjustable to adapt the machine for either cylindrical or taper grinding. A tailstock 9, having a work engaging center 10 in axial alignment with the spindle 8, may be adjustably mounted on longitudinal ways 11 formed on the top of an elongated frame extension 12 of the headstock 7. The top of the base also supports a tool fixture 14 mounted for cross feed and adjustment. The fixture 14 has a power driven spindle 15 which is adapted to support a suitable grinding element or wheel 16 for operative engagement with the work, and which is angularly adjustable to compensate for the lead angle of the work thread when grinding screw elements.

The headstock

Figure 2:
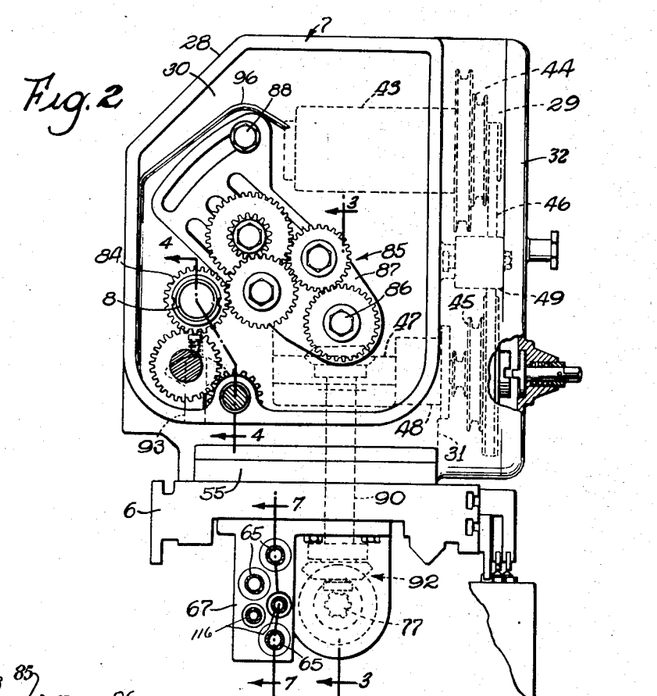
Fig. 2 is a vertical sectional view of the headstock taken along line 2—2 of Fig. 1.
Figure 3:
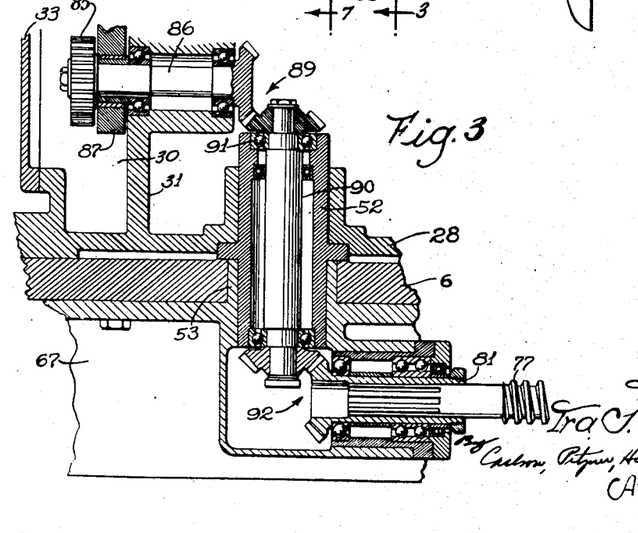
Fig. 3 is a fragmentary sectional view taken along line 3—3 of Fig. 2.

One end of the headstock is formed with a hollow upstanding spindle housing 28 formed internally with a drive compartment 29 and a change gear compartment separated by an intermediate wall 31. The compartment 29 is closed at the front by a removable cover 32, and the compartment 30 is closed at the end by a removable cover 33. The spindle 8 is journaled adjacent opposite ends in suitable antifriction bearings 34 and 35 mounted respectively in the end walls of the compartment 29, and preferably is tubular and of the flange nose end type. Thus, the outer or operative end of the spindle 8 is provided with a flange 36 formed with an axial locating bore or recess 37 to mount a work fixture such as a chuck (not shown). The outer end portion of the spindle bore is tapered to form a socket 38 for a sleeve 39 into which a work center 40 may be removably inserted. An opening 41 in the cover 33 for the compartment 30 and normally closed by a removable plate 42 affords access to the inner end of the spindle 8 and permits inserting long work pieces through the spindle.

Figure 4:
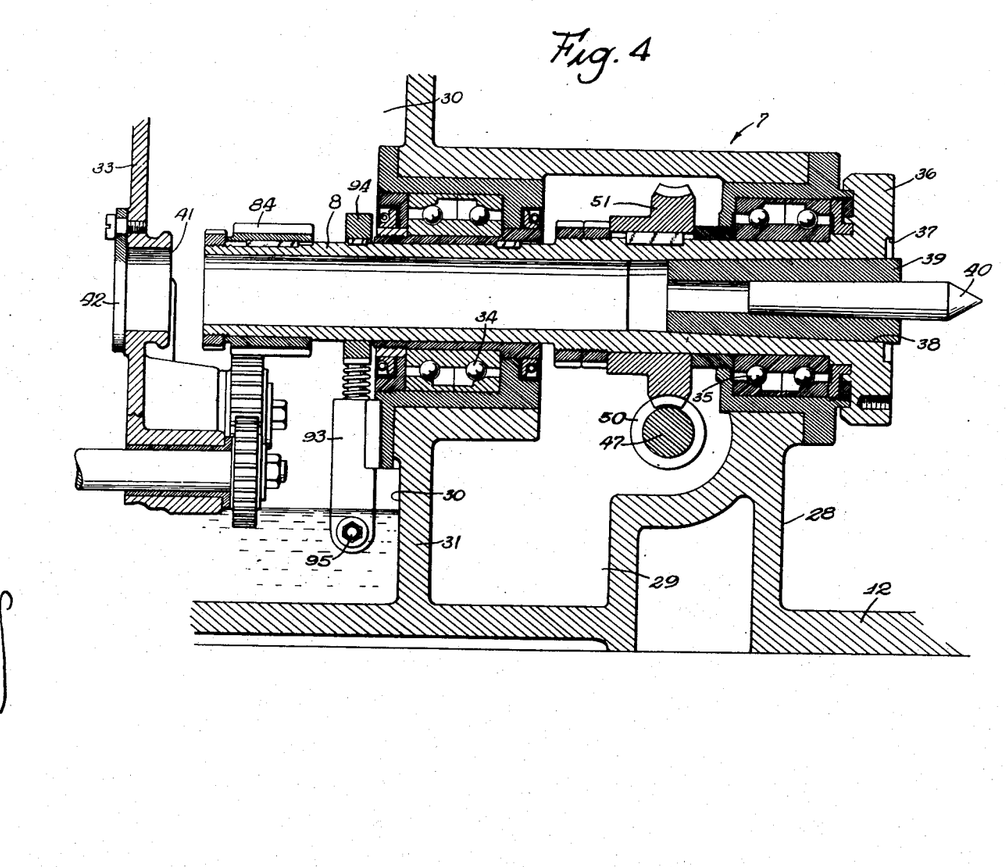
Fig. 4 is a fragmentary substantially vertical sectional view taken along line 4—4 of Fig. 2, and illustrating the mounting and drive for the headstock spindle.

Rigidly mounted within the drive compartment 29 is a motor 43 which in the present instance is of the rotary hydraulic type. The motor 43 is connected through step pulleys 44 and 45 and a belt 46 to a transverse worm shaft 47 journaled in antifriction bearings 48. An idler pulley 49 serves to tension the belt 46. A worm 50 on the shaft 47 meshes with a worm wheel 51 fixed on the spindle 8 between the bearings 34 and 35 to complete the rotary drive transmission.

The elongated headstock 7 is mounted on the table 6 for pivotal adjustment about a vertical axis to permit either cylindrical or taper grinding. More particularly, a tubular pivot sleeve 52 is fixed in the bottom of the housing 28, and is swiveled in a sleeve 53 in the table 6. Pivotal adjustment of the headstock 7 may be effected by any suitable means operable by a hand knob 54 at the front of the table 6, and the headstock is adapted to be clamped in position of adjustment by suitable gibs 55 and 56 slidably overlying the extreme ends.

Fluid under pressure is adapted to be supplied reversibly to the motor 43 through lines 57 and 58. To connect these lines to the motor without necessitating the use of a perishable flexible hose, a manifold plate 59 (see Figs. 6 and 7) is bolted to the left end of the base section 2 below the table 6. The plate 59 is formed with three parallel bores 60 opening therethrough longitudinally of the base section 2 to a recess 61 normally closed by a cover 62, and with three passages 63 peripherally intersecting the bores. Two of the passages 63 are connected respectively to the lines 57 and 58 and the third is connected to a drain line 64. Anchored at their outer ends with a fluid tight seal to the manifold block 59, in communication respectively with the bores 60, are three parallel tubes 65 which are plugged or closed at their inner ends and which extend freely through three parallel bores 66 opening longitudinally through an elongated manifold block 67 on the underside of the table 6.

Figures 6, 7:
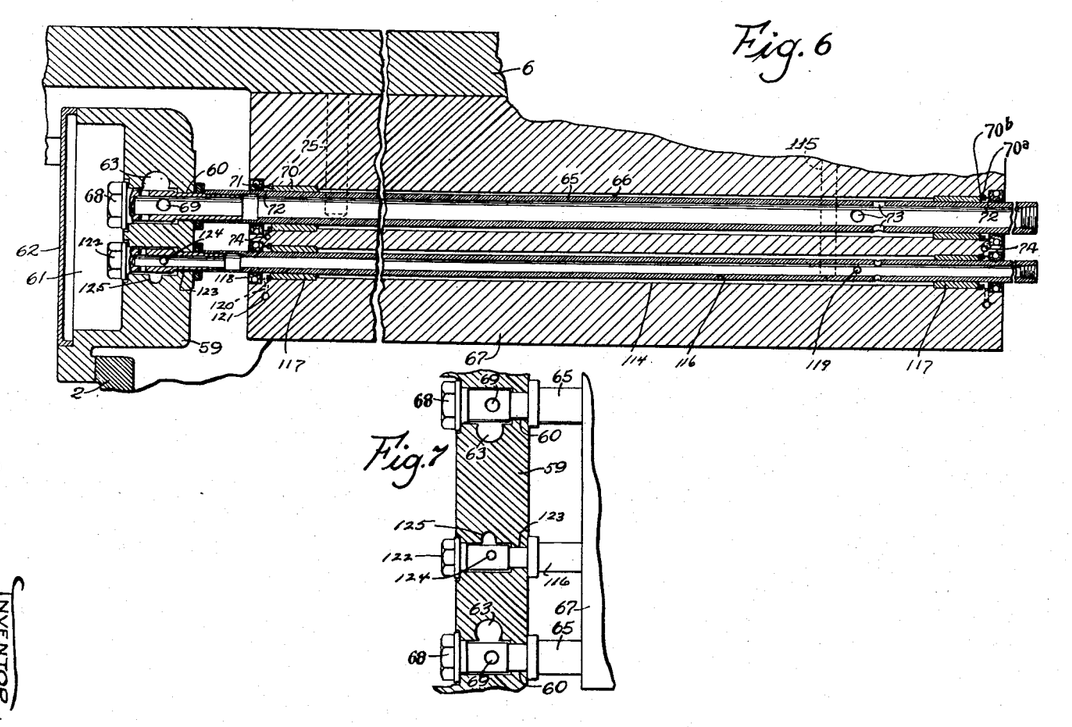
Fig. 6 is a fragmentary vertical sectional view of the work table, and particularly the means for supplying pressure fluid thereto.
Fig. 7 is a fragmentary vertical sectional view taken along line 7—7 of Fig. 2.

Each of the tubes 65 is secured to the manifold plate 59 by a bolt 68 extending through the associated bore 60 into internally threaded engagement with the tube and accessible in the recess 61. The bolt 68 is tubular and closed at the head end so as to constitute in effect an extension of the tube 65, and is formed with a plurality of radial ports 69 open to the associated passage 63. The bore 66 in the manifold block 67 is of a larger diameter than the tube 65 to provide a peripheral fluid space. Plain bushings 70 are fixed in the bore 66 adjacent the outer ends and have a close sliding fit with the tube 65 to provide a guide and a hydraulic seal. Suitable square wire snap rings 70a are inserted into internal grooves 70b in the bore 66 in position to engage the outer ends of the bushings 70 and thereby anchor the latter against the high fluid pressure in the bore between the bushings. Additional peripheral seals 71 are provided in the ends of the bore 66 in axially spaced relation to the bushings 70, and coact with the latter to define small intermediate annular spaces or chambers 72 adapted to collect any outwardly leaking fluid. The tube 65 is formed with radial ports 73 which open from the interior thereof to the associated bore 66.

The various chambers 72 at the ends of the bores 66 are connected through passages 74 in the manifold block 67 to one of the bores 66 in communication with the drain line 64 so as to provide an outlet for the leakage of fluid. The other two bores 66 are in communication with passages 75 opening through the block 67, the pivot sleeve 52 and the housing 28, respectively, to opposite sides of the motor 43. It will be evident that the various tubes 65 and the block 67, by reason of their telescoping relationship, serve to connect the fluid lines 57 and 58 and the drain line 64 to the carriage 6 in any position of reciprocation of the latter, and that the passages 75 in opening through the sleeve 52 permit angular adjustment of the headstock without interfering with the connection of the fluid lines 57 and 58 from the carriage to the motor 43.

*The table drive*

Translation of the table 6 is effected through a nut 76 and a lead screw 77 which are mounted for relative rotation, and of which one is fixed to the base section 2 and the other is movable with the table. In the present instance, the nut 76 is supported in a normally fixed position in a sleeve 78 attached to the base section 2, and the screw 77 is supported for a rotary drive on the underside of the table 6. One end of the screw 77 is freely splined for relative axial adjustment in a sleeve 81 rotatably mounted in antifriction bearings 82 confined in a lug 83 on the side of the manifold block 67. The sleeve 81 is operatively connected for rotation in timed relation to the work spindle 8. In the present instance, the drive connection includes a gear 84 fixed on the inner end of the spindle 8 within the gear compartment 30 of the headstock housing 28. The gear 84 is connected through suitable change gears 85 to a shaft 86 journaled in the wall 31. The change gears 85 are adjustably and removably mounted on a quadrant 87 pivoted on the shaft 86 and adapted to be clamped to the wall 31 in position of adjustment by means of a bolt 88. Bevel gears 89 serve to connect the shaft 86 to a vertical shaft 90 extending downwardly coaxially through the pivot sleeve 52 and supported therein by suitable antifriction bearings 91. The lower end of the shaft 90 is connected through bevel gears 92 to the sleeve 81, thereby completing the drive to the lead screw 77.

The bottom of the gear compartment 30 constitutes a reservoir adapted to contain a lubricant for the gearing therein. An oil pump 93 is mounted in the bottom of the compartment 30, and is driven by a cam 94 on the spindle 8. The pump 93 has an intake 95 below the oil level, and an outlet line 96 discharging in the top of the compartment above the gearing.

Figure 5:
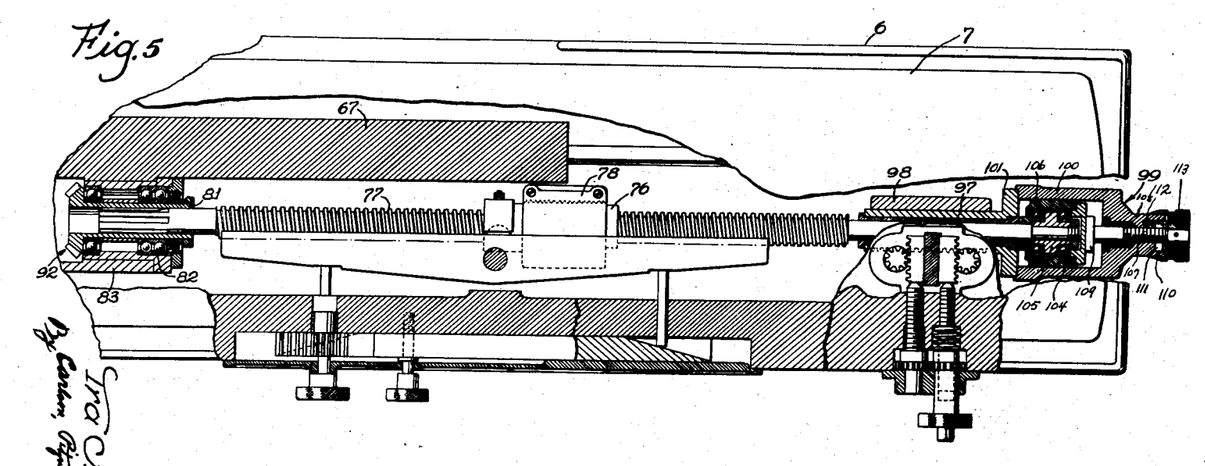
Fig. 5 is a fragmentary horizontal broken sectional view of the work table illustrating particularly a taper compensating mechanism.

The right end of the lead screw 77 is adjustably anchored in a fixed axial position relative to the table 6. As herein shown, the right end shaft extension of the lead screw 77 extends slidably and rotatably through an elongated bearing sleeve 97 which is secured for axial adjustment in a lug 98 on the underside of the table 6. A backlash compensating device 99 is mounted on the sleeve 97, and takes the end thrust of the lead screw 77.

The backlash device 99 comprises a cylinder 100 which is mounted at one end on a flange 101 on the sleeve 97, and which has connections at opposite ends with pressure fluid supply lines 102 and 103. A piston 104 is reciprocable in the cylinder 100, and is connected to the shaft extension of the lead screw 77. In the present instance, the connection comprises a collar 105 secured to the screw 77, and retained for rotation between antifriction end-thrust bearings 106 in the piston 104. An adjustment screw 107 is threaded through a tubular extension 108 on the closed outer end of the cylinder 100, and has a stop 109 on the inner end disposed for engagement by the piston 104 to limit the stroke or range of movement of the latter. The adjustment screw 107 is placed under a frictional tension load to eliminate lost motion by a nut 110 threaded thereon within an axial recess 111 in the outer end of the tubular extension 108 and urged outwardly by coil compression spring means 112.

A hand knob 113 is fixed on the outer end of the screw 107. An indicator 107a is mounted on the cylinder 109 of the device 99 and coacts with a bracket 107b on the lug 98 to facilitate adjustment of the range of movement of the piston 104 by means of the screw 107. Hydraulic pressure fluid is supplied selectively through one or the other of the lines 102 and 103 to shift the screw 77 relatively to the table 6 and thereby compensates for the total backlash. Upon reversing the table 6, the take-up on the screw 77 is also reversed to move the table ahead in the new direction of travel an adjustable extent corresponding to the backlash so that the cutting path of the grinding wheel 16 will be exactly the same in both directions of table movement.

Since the backlash device 99 is an auxiliary mounted on the table 6, the lines 102 and 103 to the cylinder 104 are connected through the manifold block 67 in the same manner as the lines 57 and 58 to the spindle motor 43. Thus, the block 67 is formed with two longitudinal bores 114 connected through passages 115 respectively to opposite ends of the cylinder 104. Two tubes 116 are relatively reciprocable in guide bushings 117 and seals 118 in the outer ends of the bores 114, and are formed with radial ports 119 intermediate their ends. Leakage chambers 120 between the bushings 117 and seals 118 are connected through passages 121 to the drain bore 66. The fixed ends of the tubes 116 are connected to the manifold plate 59 by means of bolts 122 which extend through bores 123 in the plate and which have radial ports 124 open to passages 125 intersecting the bores and connected respectively to the lines 102 and 103.

Hydraulic operating system

Figure 8:
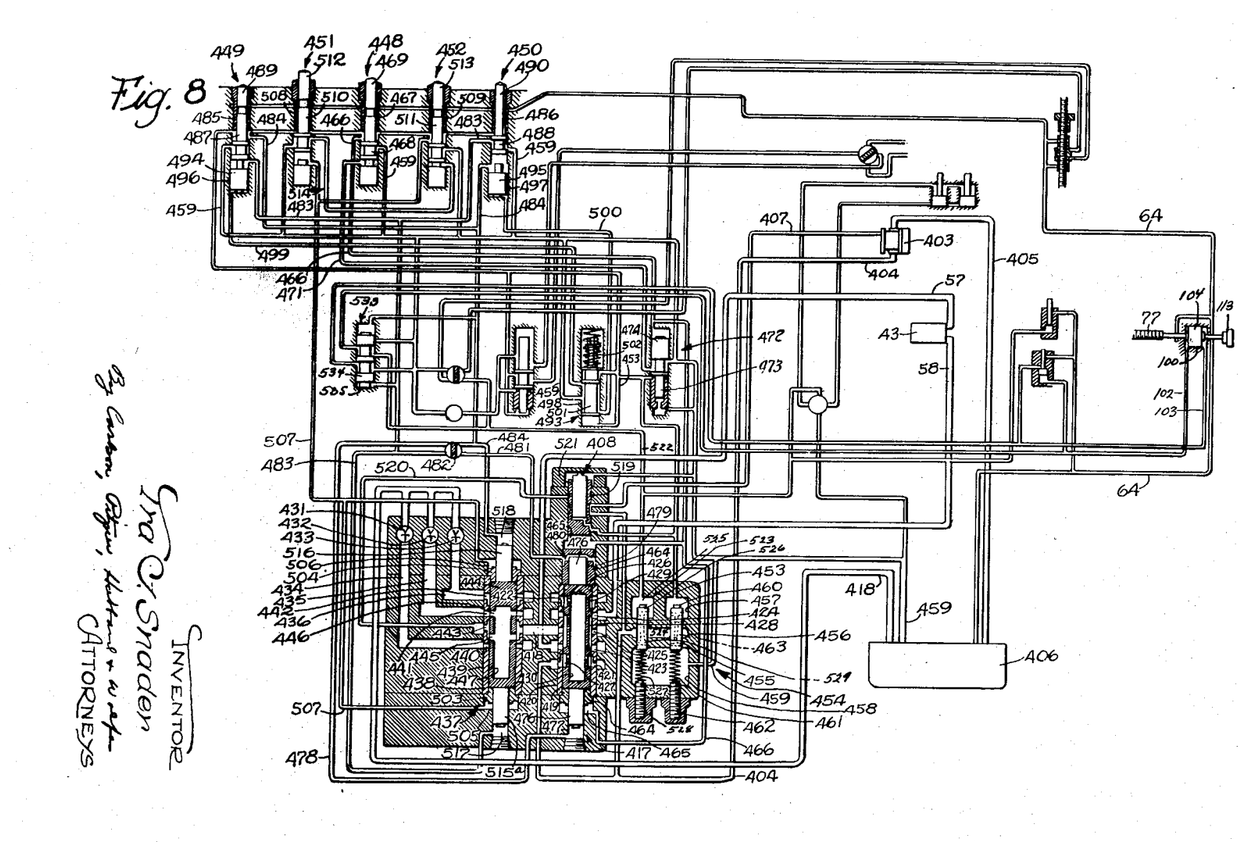
Fig. 8 is a diagrammatic representation of the hydraulic circuits for the machine.

Fluid under pressure is adapted to be supplied by a variable delivery pump 403 having a discharge line 404 and an intake line 405 opening from a sump 406 within the base 1. The pump 403 may be of any suitable character, and preferably is of the orifice pressure controlled type disclosed in Patent No. 2,299,234, issued October 20, 1942, to Ira J. Snader and Max A. Mathys. More particularly, the pump 403 has a control line 407 which, as hereinafter described, is adapted to be connected by a valve 408 either to the exhaust side of the hydraulic system for utilization of a pressure built up by a flow restriction to cause the delivery of fluid in variable amounts as required and at a predetermined substantially constant pressure without the use of relief valves, or to the pressure discharge line 404 to substantially stop fluid delivery except as required to maintain said pressure. The pump 403 may be driven by any suitable means, such as an electric motor 410 connected thereto through a drive coupling 409, and controlled by start and stop buttons 411 and a master stop button 412 for the entire machine on the front of the machine base 1. To prevent the transmission of vibration, the pump 403 and the motor 410 are mounted on a base 413 resiliently supported as by rubber on the floor adjacent the base 1.

The pressure line 404 opens to a main hydraulic control panel 416 on the front of the base section 2. The hydraulic panel is sectionally constructed of castings and grooved plates housing the various control valves and defining the connecting passages in a compact arrangement.

A suitable direction and stop valve 417 is operable to connect the pressure line 404 selectively to either of the lines 57 and 58 leading to the motor 43 for driving the table 6 and the work spindle 8, and simultaneously to connect the other of said motor lines to an exhaust line 418 discharging to the sump 406.

In its preferred form, the valve 417 comprises a tubular bushing 419 fixed in a bore 420 in the panel 416, and having formed therein in longitudinally spaced relation two pressure ports 421 and 422 of which the port 421 is connected to the line 404, two motor supply ports 423 and 424 between the pressure ports and connected respectively to the lines 57 and 58, and a central exhaust port 425 between the supply ports and connected to the exhaust line 418. A valve piston 426 of the spool type is reciprocable in the bushing 419, and is formed with three longitudinally spaced peripheral grooves or recesses 427, 428 and 429. The central recess 428 is always open to the exhaust port 425, and the end recesses 427 and 429 are interconnected through an axial bore 430 in the piston 426 and are always open to the pressure ports 421 and 422. It will be evident that in one end position of the valve piston 426, the lines 57 and 58 will be connected respectively to the pressure and exhaust lines 404 and 418 to operate the motor 43 in one direction, and in the other end position, the connections will be reversed to operate the motor in the opposite direction. In the central or neutral position, both lines 57 and 58 will be disconnected from the pressure line 404 and connected to the exhaust line 418.

Suitable flow restriction means is interposed in the exhaust line 418 to control the rate of drive by the motor 43 in either direction. In the present instance, this means consists of three adjustable restriction orifice valves 431, 432 and 433 located respectively in three parallel branch lines 434, 435 and 436, and adapted for selective connection in the exhaust line 418 by a three position valve 437. These orifice valves are independently adjustable from the front of the panel 416. In the present instance, the orifice valve 432 in the intermediate branch line 435 is adjusted to provide a relatively large flow area adapted to effect a rapid traverse, and the other orifice valves 431 and 433 are adjusted to provide relatively small flow areas adapted to effect slow drive speeds or feeds.

The orifice selection valve 437 comprises a bushing sleeve 438 fixed in a bore 439 in the panel 415. Four longitudinally spaced ports 440, 441, 442 and 443 are formed in the sleeve 438 and open respectively to the lines 434, 435, 436 and 418. A valve piston 444 is reciprocable in the sleeve 438, and is formed with two longitudinally spaced sets of ports 445 and 446 interconnected by an axial bore 447. The arrangement is such that the ports 441 and 446 are connected to institute rapid traverse when the piston 444 is in central position, the ports 440 and 445 are connected to institute a slow feed when the piston is in one end position, and the ports 442 and 446 are connected to institute a second slow feed when the piston is in the other end position.

The operation of the valves 417 and 437 is under the control of a plurality of pilot valves consisting of a start and stop valve 448, direction control valves 449 and 450, and speed control valves 451 and 452. These pilot valves are located in a panel 415, and are included in pilot control circuits under a relatively low operating pressure.

Fluid is supplied from the main pressure line 404 to a pilot pressure line 453 under the control of an automatic regulating valve 454. This valve comprises a bore 455 opening centrally to a high pressure chamber 456 connected to the line 404, and at opposite ends respectively to a low pressure chamber 457 connected to the line 453 and an exhaust chamber 458 connected to an auxiliary exhaust line 459 leading to the sump 406. A plunger 460 extends slidably through the bore 455, and is urged endwise against the pressure in the chamber 457 by a compression spring 461 seated against an adjusting screw 462 in the exhaust chamber 456. The plunger 460 is formed with a longitudinal bore 463 open to the low pressure chamber 457, and adapted for communication with the chamber 456 or the chamber 458. When the pressure in the chamber 457 is too low, replenishing fluid will be supplied from the chamber 456 through the bore 463. When the pressure is at the desired value determined by the spring 461, the bore 463 will be closed to cut off the flow of fluid. In the event of high pressure leakage, the resulting excess pressure will be by-passed to the exhaust chamber 458. As a result, a balanced relatively low constant pressure is substantially maintained in the line 453 at all times.

The direction valve 417 is movable into stop position by two centering plungers or collars 464 which are freely reciprocable in cylinders 465 at opposite ends of the bore 420 for engagement with opposite ends of the valve piston 426. The outer ends of the cylinders 465 are open to a line 466 adapted for connection by the pilot valve 448 either to the pressure line 453 or the exhaust line 459.

The start and stop pilot valve 448 comprises a valve bore 467 formed in and opening to the top of the panel 415. A differential valve plunger 468 is reciprocable in the bore 467, and has an actuating stem 469 projecting outwardly for engagement by a stop dog 470 adjustably mounted on the table 6. The bore 467 has suitable port connections with the lines 459 and 466, and is always open at the small end of the plunger 469 to the pressure line 453. The bore 467 is also open at the large end of the plunger 469 to a line 471 adapted to be connected by a hand valve 472 either to the pressure line 453 or the exhaust line 459. The hand valve 472 comprises a differential cylinder 473 connected at the large and small ends respectively to the lines 466 and 459, and having suitable port connections in one side with the lines 453 and 471. A differential valve piston 474 is reciprocable in the cylinder 473 by a hand lever 475.

To institute operation, the valve piston 474 is moved into position to connect the lines 453 and 471. Thereupon, the valve plunger 468 is elevated by differential pressure, and connects the lines 459 and 466 to release the direction valve 417 for adjustment into either end position. Upon lowering the plunger 468 either by the dog 470 or through actuation of the hand valve 472 to exhaust the line 471, pressure fluid is supplied to the line 466 to center the direction valve 417 and to move or hold the hand valve 472 in stop position.

The direction valve 417 is reversible by two pins or plungers 476 adapted to act against the opposite ends of the valve piston 426. One of the reversing plungers 476 is reciprocable in a cylinder 477 connected to a fluid supply line 478, and extends axially through the adjacent centering collar 464. The other plunger 476 is reciprocable in a cylinder 479 formed in the other centering collar 464, and connected through a peripheral port 480 in the latter to a fluid supply line 481. The lines 478 and 481 are adapted to be connected through a rotary hand valve 482 to two lines 483 and 484 controlled by the direction pilot valves 449 and 450. The valve 482 is adjustable to reverse these connections for the grinding of left hand threads so that the spindle drive will properly conform to the lead screw rotation as controlled by the change gearing 85.

The pilot valves 449 and 450 respectively comprise two vertical bores 485 and 486 formed in and opening to the top of the panel 415, and two spool valve plungers 487 and 488 reciprocable therein and having axial stems 489 and 490 projecting therefrom for selective engagement by dogs 491 and 492 adjustably mounted on the table 6. The pressure line 453 opens to the upper ends of the bores 485 and 486, and the pressure fluid therefrom acts against the relatively small upper piston areas of the plungers 487 and 488. The bores 485 and 486 also have port connections with the exhaust line 459 and respectively with the lines 484 and 483. The latter also open respectively to the lower ends of the bores 485 and 486 to provide cross connections so that the pilot valves 449 and 450 will reset each other alternately in operative position for respective coaction with the dogs 491 and 492.

The port connections are such that when the plunger 489 is depressed, the cross line 484 will be connected to the pressure line 453, thereby causing upward movement of the plunger 490 to connect the other cross line 483 to the exhaust line 459. As a result, the plunger 489 is locked in depressed position, the plunger 490 is held in elevated position, and one directional pin 476 is actuated to move the direction valve 417 into position to institute carriage movement to the left. Conversely, when the plunger 490 is depressed, the lines 483 and 484 are connected respectively to the pressure and exhaust lines 453 and 459 to reverse the valve 417 and institute carriage movement to the right. Adjustment of the hand valve 482 for grinding left hand threads will reverse the motor 43 and hence the rotation of the work spindle 8 in relation to the pilot valve control, but the directional control of the table 6 is left unchanged by suitable changes in the gearing 85 in the lead screw drive.

The direction pilot valves 449 and 450 may be reversed at any time independently of the dogs 491 and 492 by means of a hand valve 493. To this end, two lifting pistons 494 and 495 are mounted in cylinders 496 and 497 at the lower ends of the bores 485 and 486, and normally constitute stops for the plungers 487 and 488. However, either of these pistons 494 and 495 may be actuated hydraulically to elevate the associated pilot plunger into operative position. The hand valve 493 comprises a bore 498 having port connections with the pressure and exhaust lines 453 and 459 and with two lines 499 and 500 opening respectively to the lower ends of the lifting cylinders 496 and 497. A valve piston 501 of the spool type is normally held by spring means 502 in central position to connect both of the lines 499 and 500 to the exhaust line 459. Movement of the valve piston 501 into opposite end positions serves to connect the lines 499 and 500 respectively and reversibly to the lines 453 and 459 to supply pressure fluid selectively to one or the other of the cylinders 496 and 497.

The orifice selection valve 437 is controlled by the rapid traverse pilot valve 452 and the feed pilot valve 451 in conjunction with the direction pilot valves 449 and 450.

Two centering collars or pistons 503 and 504 are reciprocable in cylinders 505 and 506 at opposite ends of the bore 439 for engagement simultaneously with opposite ends of the valve piston 444. The outer ends of the cylinders 505 and 506 are open in parallel to a line 507 adapted for connection by the rapid traverse valve 452 either to the pressure line 453 or the exhaust line 459. The valve 452 in turn is controlled by the feed valve 451. These valves 451 and 452 respectively comprise vertical bores 508 and 509 formed in and opening to the top of the panel 415, and spool type valve plungers 510 and 511 reciprocable therein and having stems 512 and 513 projecting therefrom for selective actuation by dogs 514 and 515 adjustably mounted on the table 6. Both bores 508 and 509 are open at the upper end above the small piston areas of the plungers 510 and 511 to the pressure line 453 and have port connections with the exhaust line 459. The bore 509 also has a port connection with the line 507 which has a cross connection with the lower end of the bore 508 below the large piston area of the plunger 510. Likewise the bore 508 has a port connection with a cross line 514a opening to the lower end of the bore 509 below the large piston area of the plunger 511.

The port connections are such that when the plunger 511 is depressed pressure fluid is supplied from the line 453 to the line 507 to elevate the plunger 510 and center the valve 437. At the same time, the plunger 510 connects the cross line 514a to the exhaust line 459 to lock the valve 513 in its lower position. Fluid from the motor 43 is now exhausted through the rapid traverse orifice 432. When the feed plunger 510 is depressed, pressure fluid is supplied from the line 453 to the cross line 514a to elevate the plunger 511 which thereupon connects the line 507 to the exhaust line 459 to relieve the cylinders 505 and 506 and the lower end of the bore 508.

When the feed plunger 510 is depressed, the valve 437 is selectively adjustable automatically into opposite end positions as determined by the direction of carriage travel under the control of the direction pilot valves 449 and 450. Thus, two adjusting pistons 515a and 516 are reciprocable in cylinders 517 and 518 at opposite ends of the valve bore 439 and extend slidably through the centering pistons 503 and 504 for engagement respectively with opposite ends of the valve piston 444. The outer ends of the cylinders 517 and 518 are connected respectively to the lines 483 and 484. It will be evident that when the plunger 488 is depressed to institute carriage movement to the right, pressure fluid is supplied to the cylinder 517 to connect the feed orifice 433 in the exhaust line 459. Alternatively, when the plunger 487 is depressed to institute carriage movement to the left, the feed orifice 431 is connected in the exhaust line 459. The orifice valves 431 and 433 may be relatively adjusted to obtain the same or different rates of drive in opposite directions of carriage travel.

The table dogs may be selected and mounted to obtain different cycles of operation. The position of the reversing dogs 491 and 492 determines the location and extent of the range of table reciprocation. The stop dog 470 is of the pivotal gravity type and adapted to depress the stem 469 only upon movement of the table 6 in one direction. To stop the table in the opposite direction, it is merely necessary to reverse the dog 470 on the pivotal mounting. After depressing the stem 469, the dog 470 will swing past the latter to permit institution of the next cycle. In the arrangement as shown, if the direction dog 491 is adapted to engage the stem 489 before the dog 470 can engage the stem 469, the table reciprocation will be continuous. Conversely, if the dog 470 is adapted to engage the stem 469 before the direction dog 491 can engage the stem 489, the table 6 will come to a stop at the end of the right-hand movement.

Each of the speed control dogs 514 and 515 is also operable only upon movement of the table in one direction. As shown, the feed dog 514 is freely pivotal to the left and is, therefore, adapted to drag freely over the stem 512 upon movement of the table to the right and to depress the stem only upon movement to the left. To institute feed during table movement to the right, it is merely necessary to reverse the dog 514 on the pivotal mounting. The rapid traverse dog 515 is adapted to depress the stem 513 upon movement of the table to the right but is ineffective in the opposite direction of movement. It will be understood that any desired number of dogs 514 and 515 effective in either direction may be provided depending on the particular series of rapid traverse and feed movements to be obtained.

The pump control valve 408 is operable synchronously with the direction valve 417 under the control of the start and stop pilot valve 448. This valve 408 comprises a bore 519 open at one end to the adjacent cylinder 465 and at the other end to the exhaust line 459, and having port connections with the pressure line 453, the pump control line 407 and a line 520 branching from the exhaust line 418 ahead of the orifice selection valve 437. A differential valve piston assembly 521 is reciprocable in the bore 519. When pressure fluid is supplied to the cylinders 465 to center the valve 417 in stop position, it also acts on the large piston area of the assembly 521 to connect the motor control line 407 to the high pressure line 404 and thereby reduces the delivery of the pump to maintain a low pilot pressure in the system. When the adjacent cylinder 465 is exhausted, pressure fluid from the line 453 acts on the small piston area of the plunger 521 to connect the control line 407 to the orifice pressure line 520. The pressure set up in the exhaust line 418 by the selected orifice valve now controls the pump 403 to obtain a variable delivery as required at a constant predetermined pressure.

It will be seen that the main valves 417 and 437 and the various pilot valves 448, 449, 450, 451 and 452 are controlled and operated by the relatively low pilot pressure. As a result, the relatively high pump pressure can be confined to one valve block, and the remaining valve ports can be made relatively light without the likelihood of leakage.

Various auxiliary elements of the machine are operated by auxiliary circuits including a relatively low pressure line 522 adapted to receive pressure fluid from the main pressure line 404 under the control of an automatic regulating valve 523. This valve 523 comprises a bore 524 opening from the chamber 456 at opposite ends to the exhaust chamber 458 and a chamber 525 connected to the line 522. A plunger 526 is reciprocable in the bore 524 and is urged against the pressure in the chamber by a compression spring 527 seated against an adjusting screw 528.

The plunger has an axial bore 529 open to the chamber 525 and adapted for communication with the chamber 456 to supply pressure fluid up to a predetermined low pressure or for communication with the chamber 458 to relieve excess pressure fluid to the exhaust. The valve 523 operates in the same manner as the valve 454 to maintain a constant relatively low pressure in the line 522.

The backlash cylinder 100 for the table feed screw 77 is connected by the lines 102 and 103, and is adapted to be reversibly connected by a valve 533 to the pressure and exhaust lines 522 and 459. The valve 533 is automatically reversible with the direction valve 417 under the control of the pilot valves 449 and 450 so that the backlash will be taken up in a direction corresponding to the table movement once for each reversal of the table 6. Thus, the valve 533 comprises a bore 534 open at opposite ends to the lines 483 and 484, and a spool type valve piston 535 reciprocable therein. In one position of the piston 535, the line 102 is connected to the pressure line 522, and the line 103 is connected to the exhaust line 459, and in the other position, the connections are reversed.

Operation

The operation of the machine will be apparent from the foregoing description, and briefly summarized is as follows:

The work to be ground is attached to the work spindle 8. Then, the hand valve 482, and hence the valve 417, is adjusted to obtain the desired direction of spindle rotation, and suitable change gears 85 are used to correlate the translation of the table 6 both in rate and direction to the spindle rotation so as to describe the desired thread lead.

The switch 411 is actuated to start the motor 410, and the lever 475 is actuated to institute operation of the table 6 and the spindle 8. The table 6 will now be translated automatically through a predetermined cycle which may comprise any desired program of rapid traverse and feed movements. At any point in the cycle, the direction may be reversed by actuating the hand valve 493. The rapid traverse rate is determined by the exhaust orifice 432, and the feed rates in opposite directions are controlled respectively by the orifices 431 and 433. These orifices are independently adjustable. The reciprocation of the table 6 may be continuous or interrupted depending on the location of the stop dog 470. The operation may be discontinued at any time by actuating the hand lever 475.

At each reversal of the table 6, any existing backlash in the table drive is automatically compensated for by the device 99.

I claim as my invention:

In a machine tool having a drive backlash compensator, the combination of a base, guide means fixed to said base, a slidable member mounted on said guide means for translational movement therealong, a drive for said slidable member including a lead screw element and a nut element, one of said elements being fixed relative to said base, the other of said elements being connected to said slidable member for movement therewith, a first hydraulic motor drivingly connected to one of said elements for rotating the same, a second hydraulic motor connected for the effecting of backlash compensating movement of one of said elements relative to said other element and said slidable member and said base, pump means for supplying a source of fluid at high pressure, means including a first adjustable valve connecting said high pressure source with said first hydraulic motor, a first pressure reducing valve connected with said pump means for supplying fluid at reduced pressure to said second hydraulic motor, means including a second adjustable valve connecting said second hydraulic motor with the reduced pressure side of said first reducing valve, pilot valve means interconnected with said first and second adjustable valve means for controlling both said latter means, and a second pressure reducing valve connected with said pump means for supplying fluid at reduced pressure to said pilot valve means.

IRA J. SNADER.

References Cited in the file of this patent

UNITED STATES PATENTS

| Number | Name | Date |
|---|---|---|
| 1,723,852 | Haas | Aug. 6, 1929 |
| 1,850,392 | Haas | Mar. 22, 1932 |
| 1,896,052 | Ferris | Jan. 31, 1933 |
| 1,899,654 | Ward | Feb. 28, 1933 |
| 1,965,221 | DeHaas | July 3, 1934 |
| 2,002,924 | Romaine et al. | May 28, 1935 |
| 2,037,262 | Parsons | Apr. 14, 1936 |
| 2,061,778 | Schicht | Nov. 24, 1936 |
| 2,070,807 | Roehm et al. | Feb. 16, 1937 |
| 2,196,231 | Ridgway | Apr. 9, 1940 |
| 2,267,177 | Twyman | Dec. 23, 1941 |
| 2,391,487 | Snader | Dec. 25, 1945 |
| 2,436,406 | Snader | Feb. 24, 1948 |